United States Patent [19]

Willett et al.

[11] Patent Number: 5,398,125
[45] Date of Patent: Mar. 14, 1995

[54] LIQUID CRYSTAL PROJECTION PANEL HAVING MICROLENS ARRAYS, ON EACH SIDE OF THE LIQUID CRYSTAL, WITH A FOCUS BEYOND THE LIQUID CRYSTAL

[75] Inventors: Stephen J. Willett, St. Paul; David J. W. Aastuen, Farmington, both of Minn.

[73] Assignee: Minnesota Mining and Manufacturing Company, St. Paul, Minn.

[21] Appl. No.: 150,215

[22] Filed: Nov. 10, 1993

[51] Int. Cl.⁶ .................................... G02F 1/1335
[52] U.S. Cl. ............................ 359/41; 359/40; 359/42; 359/48; 359/49
[58] Field of Search ............ 359/40, 41, 42, 48, 359/49, 50, 82, 619, 621; 353/32, 30; 348/766, 790, 791, 761

[56] References Cited

U.S. PATENT DOCUMENTS

| | | | |
|---|---|---|---|
| 5,056,912 | 10/1991 | Hamada et al. | 353/38 |
| 5,101,279 | 3/1992 | Kurematsu et al. | 358/241 |
| 5,126,863 | 6/1992 | Otsuka et al. | 359/41 |
| 5,315,330 | 5/1994 | Hamada | 359/40 |
| 5,502,783 | 10/1991 | Hamada | 359/40 |

FOREIGN PATENT DOCUMENTS

| | | | |
|---|---|---|---|
| 0440495A2 | 8/1991 | European Pat. Off. | G02F 1/1335 |
| 3267918 | 11/1991 | Japan | 359/41 |

*Primary Examiner*—William L. Sikes
*Assistant Examiner*—Kenneth Parker
*Attorney, Agent, or Firm*—Gary L. Griswold; Walter N. Kirn; Eric D. Levinson

[57] ABSTRACT

A liquid crystal projection panel for use in a projection system. The projection panel is comprised of a large number of pixels of liquid crystal defining a image forming plane provided between two transparent substrates. Microlens arrays are provided on both sides of the projection panel. The microlenses in both arrays have focal lengths such that parallel light rays entering the microlenses at an angle perpendicular to the arrays are focused at points beyond the image forming plane of the display.

10 Claims, 3 Drawing Sheets

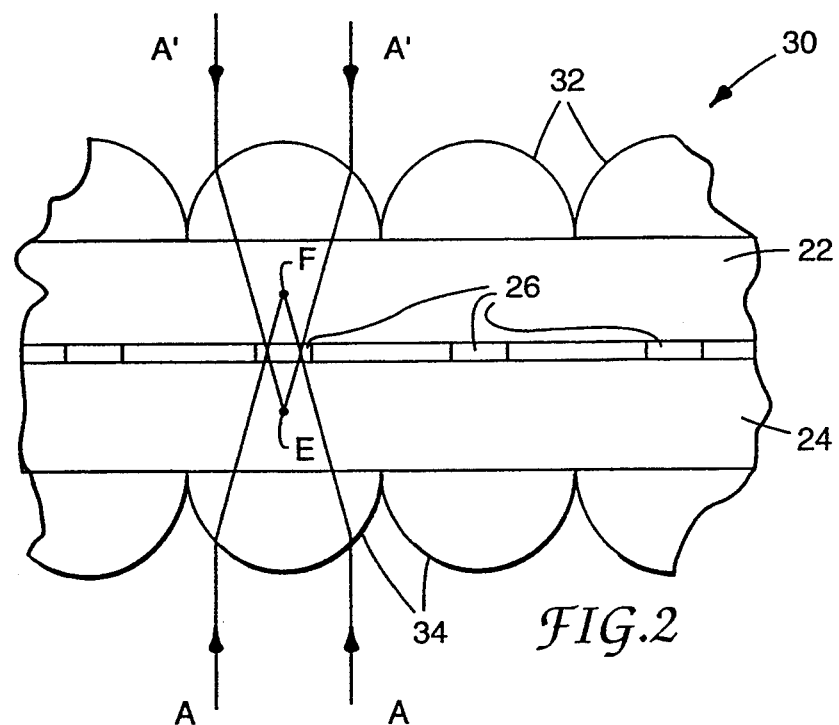
FIG.2
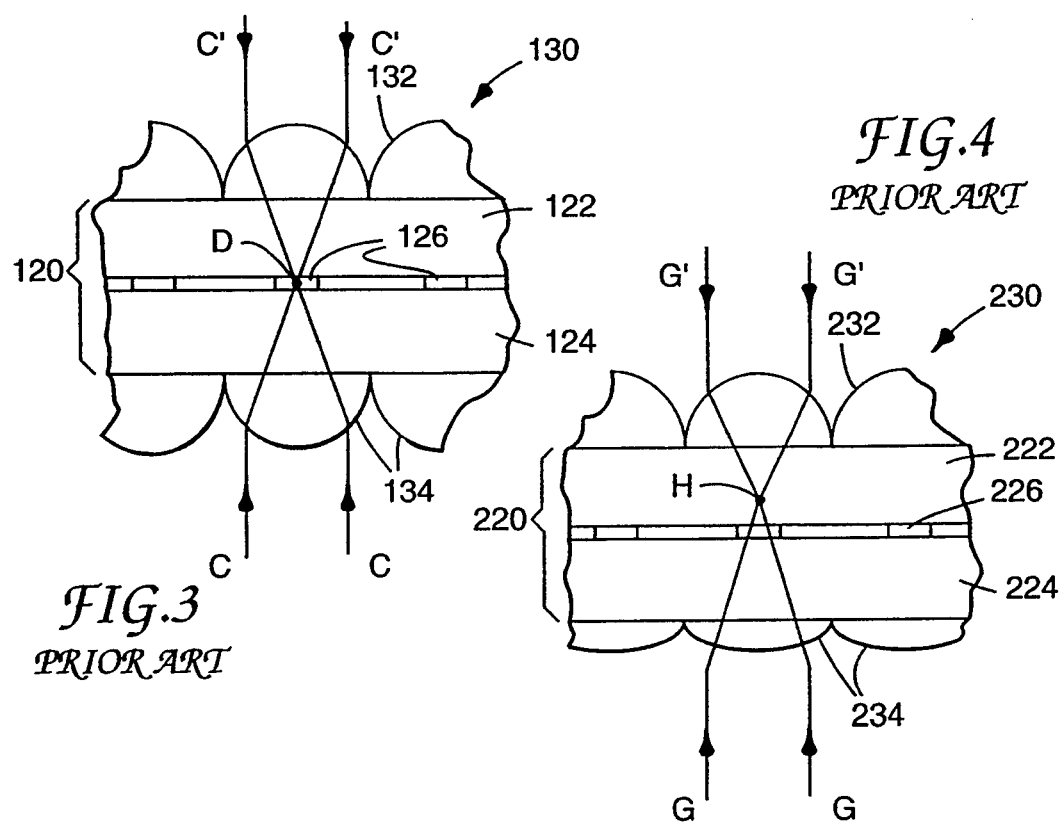
FIG.3 PRIOR ART
FIG.4 PRIOR ART

LIQUID CRYSTAL PROJECTION PANEL HAVING MICROLENS ARRAYS, ON EACH SIDE OF THE LIQUID CRYSTAL, WITH A FOCUS BEYOND THE LIQUID CRYSTAL

FIELD OF THE INVENTION

The present invention relates generally to liquid crystal displays, and more particularly to liquid crystal display projection panels which include microlens arrays.

BACKGROUND OF THE INVENTION

Thin, lightweight liquid crystal displays have become popular for use in electronic presentation devices, computer displays, and entertainment devices. In particular, active matrix addressed liquid crystal displays (most commonly of the thin film transistor type) offer high information content, full color, high contrast, and fast video refresh rate. However, these liquid crystal displays suffer from low transmission, typically 3-5%, which necessitates high power backlights and reduced ambient lighting. A major factor in the low transmission is the aperture ratio of about 30-40% to accommodate space for transistors and bus lines on the display.

It would be desirable to have a liquid crystal projection panel having improved brightness.

SUMMARY OF THE INVENTION

Accordingly, the present invention includes a pixellated display projection panel, such as a liquid crystal display projection panel, and two microlens arrays provided on either side of the display. The microlenses in the arrays have focal lengths such that parallel light rays entering the microlens arrays at an angle perpendicular to the arrays are focused at points beyond the image plane of the display.

The present invention also includes a projection system including the projection panel described above, a light source emitting light rays toward the display, and a means for projecting light rays exiting the panel toward a viewing screen. The projection panel may be positioned between two fresnel lenses which collimate the light rays entering the panel.

The present invention also includes a method of making a pixellated display projection panel. The method includes providing a panel such as described above, but wherein the thicknesses of the substrates vary within a known range around an average value. The optimum radius of curvature for the microlenses is selected based on the upper end of the range of thicknesses of the substrates.

BRIEF DESCRIPTION OF THE DRAWINGS

FIG. 2 shows a close-up view of the projection panel shown in FIG. 1.

FIGS. 3 and 4 show close-up schematic views of prior art projection panels.

DETAILED DESCRIPTION

Figure 1:
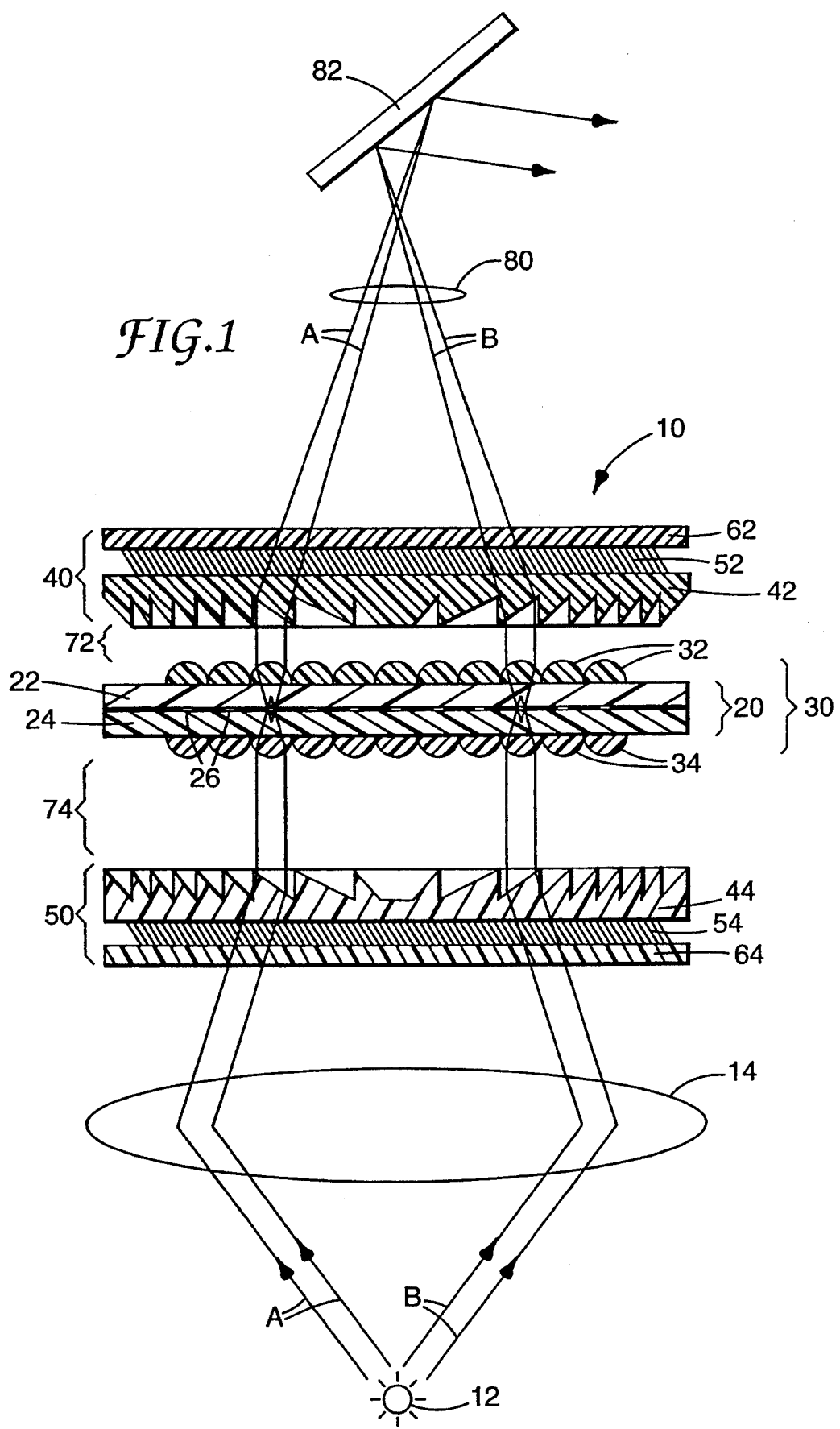
FIG. 1 shows a schematic cross-sectional side view of a liquid crystal projection panel according to the present invention.

A liquid crystal projection system 10 according to the present invention is shown in FIG. 1. Projection system 10 includes a liquid crystal display (LCD) 20, having a plurality of pixels 26 arranged regularly between two optically transparent substrates 22 and 24, and microlens arrays 32 and 34, provided on the outer surfaces of substrates 22 and 24, respectively.

Projection system 10 also includes laminated structures 40 and 50, which are spaced from microlens arrays 32 and 34, respectively, by spacings 72 and 74, respectively. Laminated structure 40 is comprised of hard protective surface 62, polarizer 52, and optional fresnel lens 42. Similarly, laminated structure 50 is comprised of hard protective surface 64, polarizer 54, and optional fresnel lens 44. Laminated structures 40 and 50 minimize the number of air interfaces in projection system 10, thereby maximizing light transmission through the system.

Projection system 10 operates as follows. Light source 12 emits diverging light rays A and B toward converging optics 14, which causes the light rays to converge toward each other as they approach protective surface 64. Converging light rays A and B then pass through hard protective surface 64 and polarizer 54 and are collimated by diverging fresnel lens 44.

Collimated rays A and B then pass through spacing 74 and are focused by microlens array 34 through pixels 26 in liquid crystal display 20. Light rays A and B are then recollimated by microlens array 32 and pass through spacing 72. Thus, the microlenses in arrays 32 and 34 must be in precise registration with pixels 26.

Collimated rays A and B then pass through converging fresnel lens 42, polarizer 52, and hard protective surface 62. Light rays A and B then proceed through projection lens 80 and are reflected by optional mirror 82 toward a viewing screen (not shown).

Polarizers 52 and 54 are preferably absorbing dye type polarizers and should be oriented with respect to each other so that liquid crystal display 20 operates in the desired mode (normally white or normally black). Hard protective surfaces 62 and 64 are preferably glass or scratch-resistant plastic. In an alternative embodiment, polarizers 52 and 54 could be thick and hard and protective surfaces 62 and 64 could instead be protective coatings that were provided on the polarizers. Fresnel lenses 42 and 44 are preferably optical plastic such as cellulose acetate butyrate, polycarbonate, or acrylic.

Microlens arrays 32 and 34 are preferably flexible, plastic, and refractive. Liquid crystal display 20 is preferably a thin film transistor (TFT) display, and may also be a color display.

Spacings 72 and 74 preferably include a gas, such as air. Forced air could be provided through spacings 72 and 74 to cool polarizers 52 and 54 and the display electronics (not shown). Laminated structures 40 and 50 should be separated from microlens arrays 32 and 34, respectively, by about 0.2 to 2 cm.

A close-up view of ray A as it passes through projection panel 30 is shown in FIG. 2. Light ray A is not focused by microlens array 34 within the image plane defined by pixels 26, but rather is focused beyond that plane, at point F. The focal plane of light ray A preferably lies in substrate 22, as shown by point F in FIG. 2.

Similarly, the microlenses in array 32 should be chosen so that their focal plane is on the opposite side of the image plane from point F. Although light would not enter microlens array 32 from above in projection system 10 as shown in FIG. 1, the microlenses in array 32 should be chosen so that light ray A' would be focused beyond the image plane at point E. The focal plane of light ray A' preferably lies in substrate 24, as shown by point E is FIG. 2. Thus, the focal plane of microlens array 32 is not co-planar with the focal plane of microlens array 34.

A close-up view of light ray C passing through a prior art projection panel 130 is shown in FIG. 3. Projection panel 130 is comprised of liquid crystal display 120, having a plurality of pixels 126 arranged regularly between two optically transparent substrates 122 and 124, and microlens arrays 132 and 134, provided on the outer surfaces of substrates 122 and 124, respectively.

Light ray C entering microlens array 134 is focused at point D in pixel 126 in the image plane of projection panel 130. The microlenses in microlens array 132 are chosen to have focal lengths such that light ray C' entering microlens array 132 would also be focused at point D in pixel 126 in the image plane of projection panel 130.

A close-up view of a light ray G passing through another prior art projection panel 230 is shown in FIG. 4. Projection panel 230 is comprised of liquid crystal display 220 having a plurality of pixels 226 arranged regularly between two optically transparent substrates 222 and 224, and microlens arrays 232 and 234 provided on the outer surfaces of substrates 222 and 224, respectively.

Light ray G entering microlens array 234 is focused at point H beyond the image plane defined by pixels 236. The microlenses in microlens array 232 are chosen to have focal lengths such that light ray G' entering microlens array 232 would also be focused at point H, before the image plane.

Projection panel 30 of the present invention offers several advantages over the prior art. First, because the light is not focused to a single point in each pixel, the design of the present invention minimizes localized heating of the liquid crystal material in the pixels, photobleaching of an optional integral color filter, and nonlinear optical effects, such as self-focusing. This also allows the light to use the entire pixel, rather than just a portion of it, thereby minimizing the likelihood that a single non-uniformity within the pixel will affect the overall projected appearance of the pixel.

Second, because the focal lengths of both microlens arrays are greater than the distance from the arrays to the image plane, the design of the present invention allows for the use of microlens arrays having microlenses which have longer focal lengths. Microlenses with longer focal lengths have larger radii of curvature, and are thus flatter. Flatter microlenses are easier to produce and are less likely to suffer from spherical aberration.

Third, unlike projection panel 230 shown in FIG. 4, the microlenses in arrays 32 and 34 can have the same focal lengths (even though they do not share a common focal plane when they are assembled into projection panel 30). This reduces costs by eliminating the need to make two different types of microlens arrays. This is also advantageous in that projection panel 30 is reversible for rear projection use, i.e., the panel can be used upside down.

Fourth, the use of the overlapping focal lengths has been found to allow for wider tolerances in the positions of the microlenses in array 32 with respect to pixels 26 and the microlenses in array 34, resulting in increased brightness of projection panel 30, decreased manufacture cost of the projection panel, or a combination of both.

Without being bound by any one particular theory, it is believed that the design of the present invention is an improvement over the prior art because the prior art projection panels are based on the assumption that the light source is an infinitely small point source, and that, therefore, the light rays incident on the microlens arrays are perfectly parallel. In reality, however, the light source, i.e., projection lamp filament, has a finite size, and as a result, the light rays incident on the microlens array are not exactly parallel.

The degree to which light rays incident on the microlens array deviate from being precisely parallel can be termed the cone angle. The cone angle is defined as the half angle of a cone of light subtended from a pinhole placed in the position normally occupied by projection panel 30 in projection system 10. Because prior art designs fail to take this cone angle into account, light is lost in those designs because some percentage of the available light may be focused before the image plane, with the result that that portion of the available light is either absorbed in the projection panel or exits at such a wide angle that it misses the projection lens. This loss of light reduces the overall brightness of the projected image.

There are at least four interrelated parameters that affect the optimum focal length for the microlens arrays in a particular projection system: (1) the actual size of pixels 26, (2) the cone angle, (3) the distance from microlens arrays 32 and 34 to pixels 26, and (4) the diameter of the entrance pupil of projection lens 80.

The thicknesses of substrates 22 and 24 used in LCDs are usually not tightly specified—1.1 mm±0.1 mm is typical. In addition, variations in thickness may arise during the assembly of the microlens arrays 32 and 34 to LCD 20. Thus, it is desirable to be able to design microlens arrays 32 and 34 to maximize the projected light, thereby assuring at least some minimum performance across the substrate thickness range, while being as tolerant as possible of these dimensional variations. This is done by using the maximum substrate (22, 24) thickness within the tolerance range, and starting with uniform input light, collimated to the same extent as the cone-angle, to find the microlens radius of curvature (assumed equal for both arrays) that gives the maximum amount of light through the projection lens. Those skilled in the art can perform these calculations by using any of several publicly available ray tracing programs.

Those skilled in the art will appreciate that although the present invention has been described with reference to an LCD, the invention has utility with any pixellater display. Those skilled in the art will also appreciate that although projection system 10 has been described as including fresnel lenses 42 and 44, the fresnel lenses are not required, i.e., projection panel 30 may be used with converging light rays.

The present invention will now be further illustrated by the following nonlimiting Example (all measurements approximate).

EXAMPLE

Figure 5:
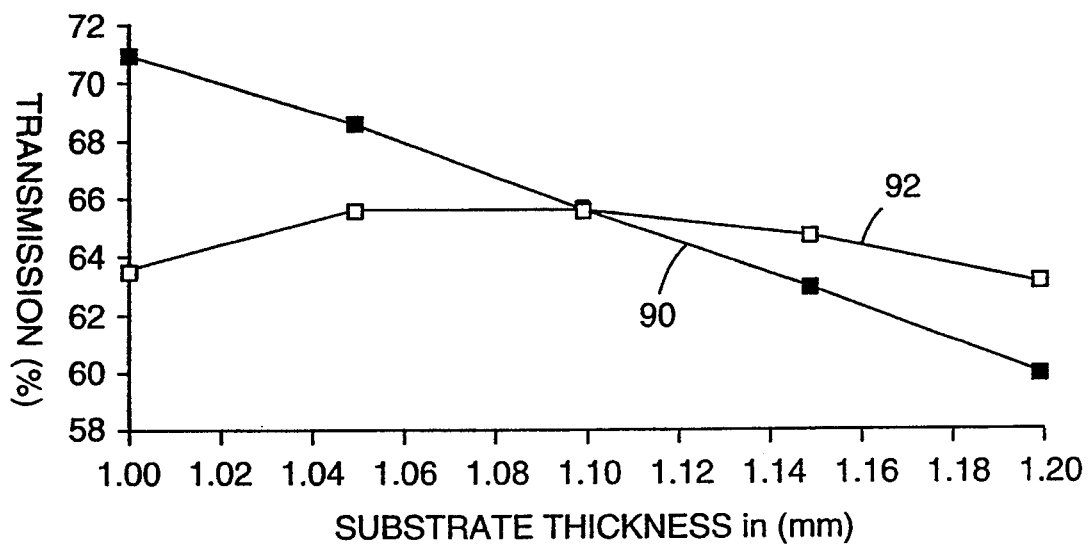
FIG. 5 is a graph of light transmission versus substrate thickness.

The following information was evaluated using a computer ray tracing program: (1) glass substrates 22 and 24 having identical thicknesses within the range of 1.1±0.1 mm, (2) 62.2 mm diameter projection lens 80, (3) acrylic microlens arrays 32 and 34 having a thickness of 0.2 mm each, attached to the substrates by a refractive index matching adhesive, (4) cone angle of 2.5° (measured on 3M Model 955 overhead projector), and (5) pixel size and shape specified by Hitachi model TM26D08VC1AB, a color VGA thin film transistor (TFT) LCD with overall diagonal measure of 264 mm commonly used for LCD projection panels, and available from Hitachi Corp., Tokyo, Japan. At the average substrate thickness of 1.1 mm, the microlens radius of curvature, R, giving the maximum light transmission through the system is calculated to be R=0.50 mm. Applying this value of R for all substrate thicknesses within the specified range yields line 90 in FIG. 5.

At the maximum substrate thickness 1.2 mm, however, it has been calculated that R=0.66 mm yields maximum transmission. Applying this value for R across the entire substrate thickness range yields line 92 in FIG. 5.

By following the method of the invention which yields line 92, the transmission through the LCD projection panel is relatively constant across the range of suitable thicknesses and will be at least 62.7%. By following the method which yielded line 90, however, the transmission varies greatly across the range, and some projection panels may have a transmission as low as 59.5%. Thus, the method of the present invention provides improved minimum transmission and improved uniformity of transmission across the range of substrate thicknesses.

We claim:

1. A pixellated display projection panel, comprising:
   a pixellated display comprised of a plurality of pixels providing an image forming plane between two optically transparent substrates;
   a first microlens array provided on one side of the display, the microlenses in the array corresponding to the pixels in the display, wherein the microlenses have focal lengths such that parallel light rays from a first direction entering the microlenses at an angle perpendicular to the first array are focused at points beyond the image forming plane of the display; and
   a second microlens array provided on the other side of the display, the microlenses in the array corresponding to the pixels in the display, wherein the microlenses have focal lengths such that parallel light rays from a direction opposite said first direction entering the microlenses at an angle perpendicular to the second array are focused at points beyond the image forming plane of the display.

2. The projection panel of claim 1, wherein the pixellated display is a liquid crystal display.

3. The projection panel of claim 1, wherein the focal length of the microlenses in the first array is substantially equal to the focal length of the microlenses in the second array.

4. The projection panel of claim 1, wherein the focal points of the microlenses in the first array are located within one of the substrates, and the focal points of the microlenses in the second array are located within the other substrate.

5. A pixellated display projection system, comprising:
   a pixellated display comprised of a plurality of pixels provided an image forming plane between two optically transparent substrates;
   a first microlens array provided on one side of the display, the microlenses in the array corresponding to the pixels in the display, wherein the microlenses have focal lengths such that parallel light rays from a first direction entering the microlenses at an angle perpendicular to the first array are focused at points beyond the image forming plane of the display;
   a second microlens array provided on the other side of the display, the microlenses in the array corresponding to the pixels in the display, wherein the microlenses have focal lengths such that parallel light rays from a direction opposite said first direction entering the microlenses at an angle perpendicular to the second array are focused at points beyond the image forming plane of the display;
   a light source emitting light rays toward the display; and
   means for projecting light rays exiting the second microlens array toward a viewing screen.

6. The projection system of claim 5, wherein the pixellated display is a liquid crystal display.

7. The projection system of claim 5, further comprising a first fresnel lens, provided between the light source and the first microlens array, for collimating the light rays, and a second fresnel lens, between the second microlens array and the projection lens, for converging the light rays.

8. The projection system of claim 5, wherein the focal length of the microlenses in the first array is substantially equal to the focal length of the microlenses in the second array.

9. The projection system of claim 5, wherein the focal points of the microlenses in the first array are located within one of the substrates, and the focal points of the microlenses in the second array are located within the other substrate.

10. A method of making a pixellated display projection panel, comprising:
    providing a pixellated display comprised of a plurality of pixels providing an image forming plane between two optically transparent substrates, wherein the thicknesses of the substrates vary within a known range around an average value;
    providing a first microlens array provided on one side of the display, the microlenses in the array corresponding to the pixels in the display, wherein the microlenses have focal lengths such that parallel light rays from a first direction entering the microlenses at an angle perpendicular to the first array are focused at points beyond the image forming plane of the display;
    providing a second microlens array provided on the other side of the display, the microlenses in the array corresponding to the pixels in the display, wherein the microlenses have focal lengths such that parallel light rays from a direction opposite said first direction entering the microlenses at an angle perpendicular to the second array are focused at points beyond the image forming plane of the display; and
    selecting the optimum radius of curvature for the microlenses in the arrays based on the upper end of the range of thicknesses of the substrates.

* * * * *